United States Patent [19]

Garnham

[11] Patent Number: 5,518,516
[45] Date of Patent: May 21, 1996

[54] METHOD OF FORMING AN OPTICAL FIBRE PREFORM

[75] Inventor: Cheryl J. Garnham, Brentwood, England

[73] Assignee: Pirelli General plc, United Kingdom

[21] Appl. No.: 377,927

[22] Filed: Jan. 25, 1995

[30] Foreign Application Priority Data

Jan. 27, 1994 [GB] United Kingdom .................. 9401600

[51] Int. Cl.⁶ ..................................................... C03B 37/00
[52] U.S. Cl. ................................. 65/382; 65/414; 65/421; 427/163.2; 427/223; 427/240; 427/249; 427/255.5
[58] Field of Search ............................. 65/393, 414, 413, 65/415, 421, 382; 427/163, 223, 255.5, 240, 249

[56] References Cited

U.S. PATENT DOCUMENTS

| | | | |
|---|---|---|---|
| 3,823,995 | 7/1974 | Carpenter | 350/96 |
| 4,233,045 | 11/1980 | Sarkar | 65/3 A |
| 4,395,270 | 7/1983 | Blankenship et al. | |
| 4,857,091 | 8/1989 | Geittner et al. | |

FOREIGN PATENT DOCUMENTS

| | | | |
|---|---|---|---|
| 0129291 | 12/1984 | European Pat. Off. | C03B 37/025 |
| 2043624 | 10/1980 | United Kingdom | C03C 17/09 |
| 2043623 | 10/1980 | United Kingdom | C03B 37/025 |

OTHER PUBLICATIONS

Patent Abstracts of Japan, vol. 8, No. 150 (C–233) 12/Jul. 1984 and JP–A–59 054 636 (Sumitomo Electric Industries Co., Ltd.).

Patent Abstracts of Japan vol. 8, No. 266 (c–255) 6 Dec. 1984 & JP–A–59 141 436 (NTT) 14 Aug. 1984.

Patent Abstracts of Japan, vol. 5 No. 144 (C–71), 11 Sep. 1981.

Patent Abstracts of Japan, vol. 7 No. 151 (C–174), 1 Jul. 1983.

Patent Abstracts of Japan vol. 2 No. 22 (e–13), 14 Feb. 1978.

*Primary Examiner*—Janyce Bell
*Attorney, Agent, or Firm*—Brooks Haidt Haffner & Delahunty

[57] ABSTRACT

In a method of forming a preform from which an optical fibre can be drawn, successive layers of matter (24, 28) are deposited by vapour deposition on a rotating cylindrical body (10) which is traversed by a heat source (15). For the deposition of at least two successive layers (24, 28), a rate of rotation of the body and/or a rate of traverse of the heat source is selected so as to generate in one of said layers a surface profile different to a surface profile generated in the other said layer.

10 Claims, 2 Drawing Sheets

METHOD OF FORMING AN OPTICAL FIBRE PREFORM

The invention relates to a method of forming an optical fibre preform.

Preforms for optical fibres may be produced by deposition of layers of matter on a substrate by vapour deposition. The deposition process may comprise passing a vapour over a surface, in the first instance over the surface of the substrate and then successively over the surface of the deposited layers, and heating the vapour to cause a chemical reaction whereby a layer of matter is deposited on the surface. Typically, the substrate is in the form of a cylindrical body which is rotated in a lathe and heat is applied to the vapour by traversing a heat source along the length of the body, each traverse, or pass, of the heat source corresponding to the deposition of a layer. As is well known, deposition may be on the outside surface of the cylindrical body, a process known as outside vapour deposition (OVD) or, where the body is tubular, on an inner surface thereof, a process known as inside vapour deposition (IVD).

Information concerning the distribution of attenuation along an optical fibre may be obtained by passing pulses of light into an end of the fibre and analysing the light reflected back to that end. This technique, known as optical time domain reflectometry (OTDR), is increasingly being used to analyse the loss along the entire length of a fibre and to detect bad fibre-fibre joints or flaws, including breaks. The use of OTDR in the optical fibre art is well known and details relating thereto may be found in literature, for example pages 236 to 244 of 'Principles of Optical Fiber Measurements' published by Academic Press (1981).

A problem which interferes with the use of OTDR in inspecting optical fibres or their preforms is that a pronounced ripple occurs in the OTDR trace even where no fault or splice is present. This is unsatisfactory and accordingly many purchasers of optical fibres are requiring that the ripple in the OTDR trace be confined within a predetermined limit or range. It is therefore important if fibre manufacturers are to minimise wastage of materials and production time, to be able consistently to produce optical fibres which meet these requirements.

We have found that ripples in the OTDR trace correspond to variations in the longitudinal section profile of the layers of the preform during the deposition process. That is, the layers each comprise a generally spiral ridge which extends over the length of the preform. Each layer, therefore, has an undulating profile defined by this ridge which appears to be generally helical in form and the ripple of the OTDR trace is related to the pitch of this profile.

We have noticed that in the manufacture of preforms although the heat source does not necessarily commence each pass from exactly the same position, the matter deposited in each pass tends to adopt a profile corresponding to the profile of the previous pass and thus a spiral or helical ridge formed during an earlier pass tends to be reinforced in a later pass. We have also noticed that the ridge formed tends to be more pronounced the greater the amount of matter deposited in a pass and thus the problem may be reduced to a certain extent by forming the preform of a greater number of relatively thinner layers. However, this increases production time and therefore also the cost of manufacturing preforms. It will therefore be appreciated that a conflict exists between the aims of improving manufacturing efficiency by reducing the number of passes employed in forming the preform and of reducing the ripple in the OTDR trace. The undulating profile of the layers of the preform, although reduced during the drawing process, is nonetheless to be found in an optical fibre drawn therefrom, albeit in a modified form.

An object of the present invention is to, at least in part, overcome some of the above described problems.

Accordingly, the invention provides a method of forming a preform from which an optical fibre can be drawn, in which method successive layers of matter are deposited by vapour deposition on a rotating cylindrical body which is traversed by a heat source, wherein for the deposition of two successive layers, a rate of rotation of said body and/or a rate of traverse of said heat source is selected so as to generate in one of said layers a surface profile different to a surface profile generated in the other said layer.

The invention also includes an optical fibre produced from a preform formed in accordance with the preceding paragraph.

Preferably, one of said two layers is the innermost layer of said preform. The innermost layer may be the first or final layer deposited according to the vapour deposition technique to which the invention is applied.

Preferably, the rate of rotation of the body during deposition of each of said at least two layers differs from the rate of rotation of said body during deposition of the other of said two layers by a predetermined amount. In practice, this difference will be a predetermined amount whereby the ripple in an OTDR trace obtained from a fibre drawn from the preform will be confined within a predetermined limit or range.

Advantageously, the rate of rotation of the body during deposition of each of at least three successive layers differs from the rate of rotation of said body during deposition of a preceding or succeeding layer of said at least three successive layers.

The rates of rotation may comprise a faster rate and a slower rate, and the faster rate may be substantially equal to one half the slower rate plus a product of the slower rate and an integer.

Advantageously, and particularly in connection with inside vapour deposition techniques, the rate of rotation of the body during deposition of a final layer is greater than the rate of rotation of said body during deposition of the preceding layer.

In connection with outside vapour deposition techniques, it is preferable that the rate of rotation during deposition of a first layer is greater than the rate of rotation of said body during deposition of the second layer.

Each successive layer may have a substantially spiral surface profile.

In order that the invention may be well understood, an embodiment thereof, which is given by way of example only, will now be described with reference to the accompanying drawings, in which.

In the following description, a method of forming a preform is described with reference to inside vapour deposition techniques, but it will be appreciated that the invention is considered to be equally applicable for use in connection with other vapour deposition techniques, for example the so-called modified chemical vapour deposition (MCVD)

technique described in GB-A-1500530 or U.S. Pat. No. 4,233,045, and the OVD technique described in U.S. Pat. No. 3,823,995. In this regard it is noted that in U.S. Pat. No. 4,233,045 the reactant vapours are caused to flow spirally to improve deposition rates, but no mention is made of any associated problem caused by the formation of generally spiral ridges in the deposited layers.

Figure 1:
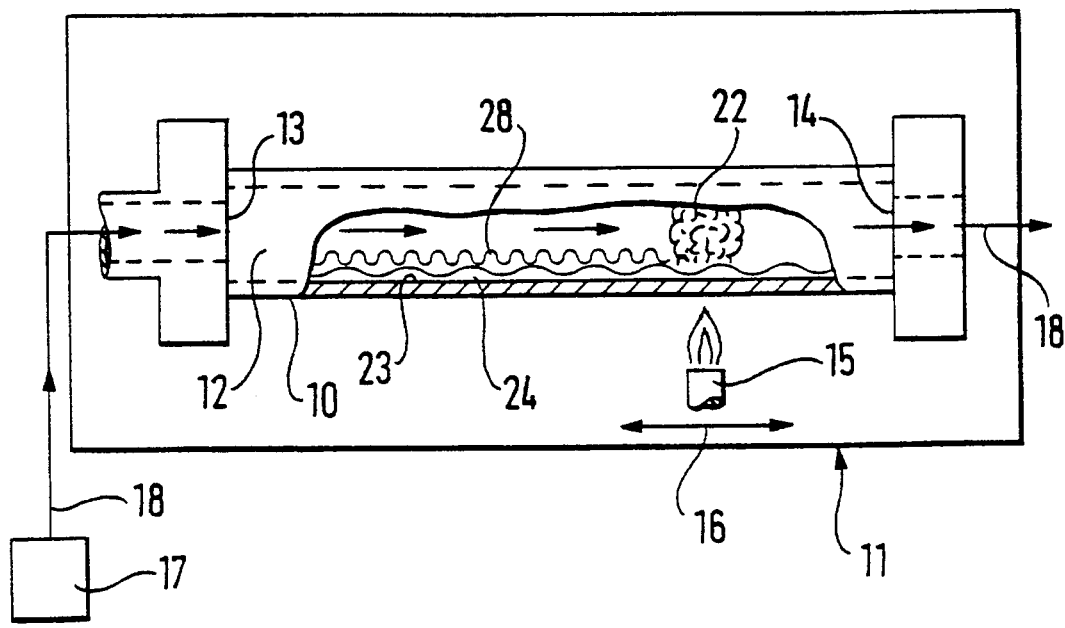
FIG. 1 is a schematic diagram showing apparatus for forming a preform by inside vapour deposition.

Referring to FIG. 1, a preform substrate in the form of a cylindrical body 10 is supported by a lathe 11 so as to be rotatable thereby. The preform substrate body is tubular having a central bore 12 open at both ends 13, 14. A heat source in the form of a gas burner 15 is mounted so as to be moveable by means not shown so as to traverse the length of body 10 as indicated by arrow 16. A gas source 17 is connected to one end 13 of the body for the introduction of vapour 18 thereto. During the production of a preform, vapour travels along the bore 12 and is allowed to exhaust from the other end 14 of the body 10. The gas source 17 is arranged so that the vapour delivered therefrom can be adjusted to a desired constitution.

In order to produce an optical fibre preform, the substrate body 10 is rotated by the lathe 11 and a vapour having the required constitution is passed through the central bore 12 of the substrate. The burner 15 is moved along the length of the body 10, from left to right in the figure, at a predetermined traverse speed. As the burner moves along the body, a heated zone 22 is formed in the body in the vicinity of the burner. A chemical reaction occurs in the vapour within the heated zone whereby matter is deposited on the surface 23 of the body.

Figure 2:
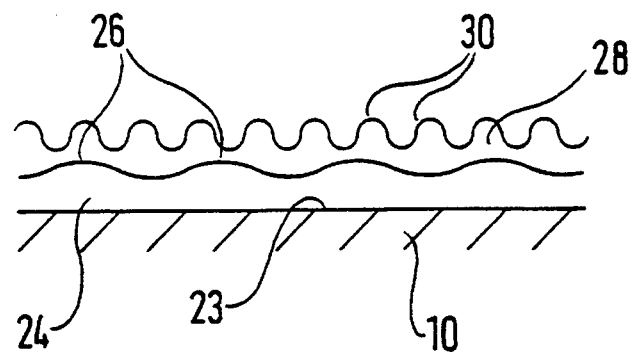
FIG. 2 is an enlarged view of a portion of a preform showing two layers of matter deposited on a substrate body, the layers having differing surface profiles.

Once the burner 15 has traversed the length of the body 10 from the one end 13 to the other end 14 a first deposition layer 24 will have been formed on the surface of the substrate. As shown in FIG. 2 the layer 24 formed on the surface 23 has an undulating profile defined by a generally helical ridge 26. The ridge 26 has a pitch generated in accordance with the distance travelled by the burner during each revolution of the body. At the end of the pass the burner is moved back to the one end 13 of the body in preparation for a second pass.

Since the constitution of the vapour may be varied (by means not shown) between passes, each deposited layer may have a required refractive index or other property. Typically several layers will be laid down using vapour having one constitution to form a region which will eventually serve as a cladding region in the optical fibre and then the gas source will be adjusted so that several more layers are laid down using vapour of another constitution to form a region which will eventually serve as the core of the optical fibre.

During the second pass the burner is again moved so as to traverse the length of the body, and in a similar manner as in the first pass a layer of matter 28 is deposited on the first layer 24. However, during the second pass, the rate of rotation of the body and/or the rate at which the heat source traverses the body is selected to be different. In this way the surface profile of the layer deposited in the second pass is made different to the surface profile of the layer deposited in the first pass.

The difference between the profiles of the two layers should be significant and we have found that in practice good results can be achieved by maintaining a constant traverse rate and varying the rate of rotation between passes. The relationship between the rotation rates should be chosen so as to optimise ripple reduction. It is believed that optimum results are achievable if the difference in rotation rate between adjacent passes is varied such that the faster of the two rates is substantially equal to half the slower rate plus a product of the slower rate and an integer. That is, if x is the slower rate, the faster rate approximates $x/2+nx$, where n is an integer.

It has also been found that good results are achieved where the variation in the body rotation rate is significant. Thus for example, varying the rotation rate between twenty and fifty rpm provides better results than changing between twenty and thirty rpm. If the traverse rate is maintained constant while the body rotation rate is increased, the burner travels a lesser distance along the body for each revolution thereof during the second pass and thus as shown in FIG. 2 the profile of a second helical ridge 30 of the second layer does not coincide with and thereby reinforce the helical ridge profile 26 of the first layer. Instead, the second ridge 30 is generated with a reduced pitch and defines an undulating surface profile which differs from the surface profile of the first layer.

Of course, in practice the final preform will normally comprise more than two layers and therefore further layers are added in a similar fashion to form a preform having the desired number of layers and properties.

It will be appreciated that it may not be necessary that the body rotation speed be varied between depositing of successive layers. Indeed, in respect of the layers which will form the cladding region of the optical fibre it may not be necessary for there to be any difference between the depositing of layers. The layers of the cladding region may instead be formed conventionally with a constant body rotation and burner traverse rate. In this case, it may be advantageous to generate a different surface profile in the first deposited layer of the core region in order to break-up the ridging developed during deposition of the cladding region layers.

The generation of different surface profiles in the layers is most advantageous in the deposition of the layers of the preform which eventually form the core region of the optical fibre and tests have shown that a preform having a core region comprising five layers formed with a constant burner traverse rate but a body rotation rate alternating for the deposition of each layer between fifty and twenty rpm will allow the production of an optical fibre having a sufficiently reduced OTDR ripple.

Figure 3:
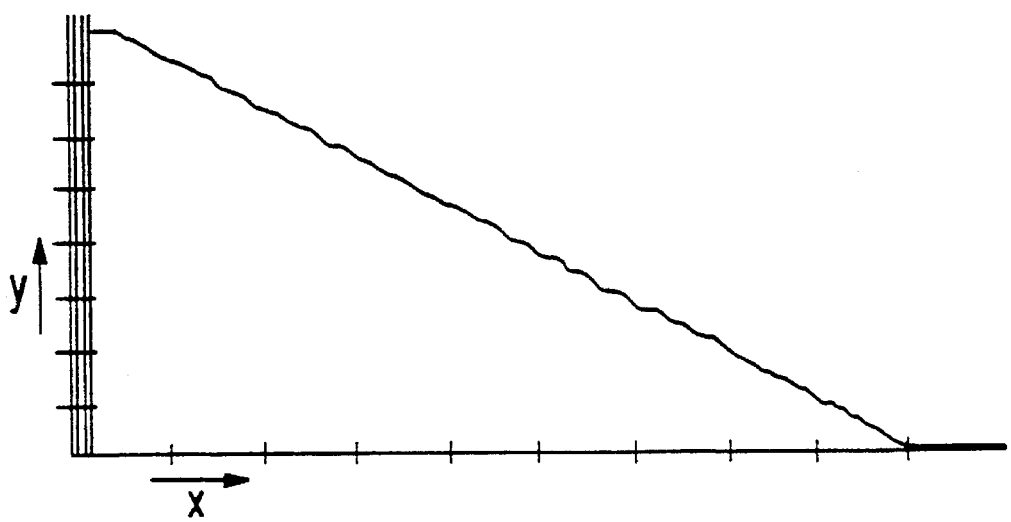
FIG. 3 is an OTDR trace obtained form a fibre drawn from a preform formed by an IVD method embodying the invention.
Figure 4:
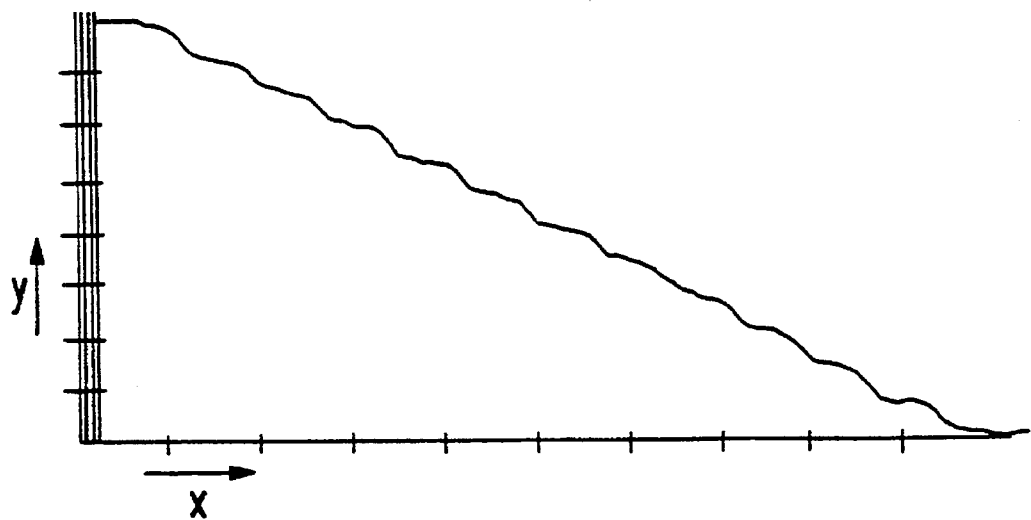
FIG. 4 is an OTDR trace obtained from a fibre drawn from a preform formed by a prior IVD method.

This is clearly demonstrated by a comparison of the OTDR traces in FIGS. 3 and 4. Both traces were obtained using a wavelength of 1310 nm and pulse width of 100 ns. The scale of the y axis is 0.2 dB/division and that of the x axis is 511 m/division in each figure. The trace in FIG. 3 was obtained from a fibre drawn from a preform having a core region comprising five layers formed as detailed above - that is with a constant burner traverse rate but with alternating body rotation rates, specifically fifty, twenty, fifty, twenty, fifty rpm. For comparison the trace in FIG. 4 was obtained from a fibre drawn from a preform having a core region comprising five layers formed with a constant burner traverse rate but with the same body rotation rate - twenty rpm. As will be seen the ripple in the trace in FIG. 4 has a significantly greater magnitude than that in the trace of FIG. 3.

OTDR traces were obtained from fibres drawn from preforms having core regions comprising (a) three layers formed at the same burner traverse rate and the same body rotation rate (specifically 20 rpm); (b) five layers formed at the same burner traverse rate and at the same body rotation rate (also 20 rpm); and (c) five layers formed at the same burner traverse rate and at alternating body rotation rates (specifically 50, 20, 50, 20 and 50 rpm). Of the fibres drawn from preforms having core regions (a) only about 30% complied with a test specification requiring the trace to be within ±0.02 dB of a least means square fit. About 70% of the fibres drawn from preforms having core regions (b) complied with this test specification - an improvement which was to be expected in view of the greater number of relatively thinner layers in the core. Of the fibres drawn from preforms having core regions (c), 99.6% complied with the test specification thus clearly demonstrating a significant improvement obtained by using alternating body rotation rates when forming the layers of the core region. Good results have also been obtained with a three layer core region formed with a constant burner traverse rate and a body rotation rate of fifty, twenty and then fifty rpm for the respective layers.

Whilst it is advantageous that the body rotation rate during the deposition of each successive core region layer differs from the rate during deposition of the preceding layer, this is not a strict requirement. It has been found that if the body rotation rate is varied for the deposition of the last two layers of the core region, that is the final and immediately preceding layer, satisfactory OTDR traces may be consistently obtained in the preforms and the optical fibres produced therefrom. It is believed that the deposition of the innermost layer is the most critical in terms of reducing OTDR ripple. In other words, it is important that the surface profile generated in the final/innermost layer be different to that of the preceding layer so that build-up of a reinforced ridge is prevented, or at least reduced, in the most critical region of the optical fibre; that is the region of maximum power propagation. In practice, good results have been achieved where the surface profile generated in the final two layers is different and the faster rotation rate is used for the final pass.

It will be readily understood that whilst the innermost layer of a preform formed by the IVD or MCVD process is the final layer deposited, in the case of the OVD process it is the first layer deposited. Thus the comments relating to the deposition of the final and the immediately preceding layer in the last preceding paragraph apply to the first and second layers deposited by the OVD process.

In addition to or instead of varying the body rotation rate or direction during the deposition of layers, the rate at which the heat source traverses the body can also be varied. As mentioned above, the pitch of the ridges generated during the deposition process is related to the distance travelled by the burner during each revolution of the body. Thus, it is possible to vary this distance by reducing or increasing the burner traverse rate whilst maintaining a constant rate of body rotation. The selection of the most beneficial passes in which to apply the faster of two traverse rates and the order in which to do so applies equally to the varying of the heat source traverse rate as it does to the above discussed varying of the rate of rotation of the body. This is because the same effect in pitch variation can be achieved either by reducing the distance of burner travel per revolution or increasing the rate of rotation, thus generating ridging having a reduced pitch, or vice versa in order to generate ridging having a greater pitch. However, it should be noted that significant variations in burner traverse rate may adversely effect the chemical reaction occurring in the heated zone in which case the deposited matter may not have the required refractive index or other property.

We have found that simply varying the speed of body rotation between all or some of the deposition passes produces a required reduction in the OTDR ripple. However, it will be appreciated that, depending on the capabilities of the apparatus available, optimum OTDR ripple reduction may be obtained by selective variation of the rates of body rotation and burner traverse rates between deposition passes, the optimum combination for the manufacture of a given preform being determined empirically.

It is believed that a beneficial effect may be obtained by also varying the sense of rotation of the body for deposition of successive layers. In this connection, attention is directed to GB-A-2043623A, GB-A-2043624A and the abstract of JP-A-59054636 in Patent Abstracts of Japan, vol. 8, no. 150 (C-233) (1587) Jul. 12, 1984. Each of these documents discloses an IVD process in which the sense of rotation of the body is reversed for the deposition of successive passes. However, there is no disclosure of using different rates of rotation and/or rates of heat source traverse to generate different surface profiles and indeed such would be contrary to the stated objects in the documents. In the GB specifications the sense of rotation of the body for successive passes is reversed to reduce anisotropy and the reversal of the sense of rotation in the JP abstract is to provide uniform application of the deposited material. In each case, the same rates of rotations and traverse rates are required for each layer.

I claim:

1. In a method of forming a preform from which an optical fibre can be drawn, in which method successive layers of matter are deposited by vapour deposition on a rotating cylindrical body which is traversed by a heat source, wherein the improvement comprises:

for the deposition of two successive layers, the rate of rotation of said body during deposition of the one of said two layers differs from the rate of rotation of said body during deposition of the other of said two layers by a predetermined amount so as to generate in one of said layers a surface profile different to a surface profile generated in the other said layer.

2. A method as claimed in claim 1, wherein one of said two layers is the innermost layer of said preform.

3. A method as claimed in claim 2, wherein said innermost layer is the final layer deposited.

4. A method as claimed in claim 2, wherein said innermost layer is the first layer deposited.

5. A method as claimed in claim 1, wherein the faster rate of said rates of rotation is substantially equal to one half the slower rate of said rates plus the product of the slower rate and an integer.

6. A method as claimed in claim 1, wherein the rate of rotation of said body during deposition of a final layer is greater than the rate of rotation of said body during deposition of the preceding layer.

7. A method as claimed in claim 1, wherein the rate of rotation of said body during deposition of a first layer is greater than the rate of rotation of said body during deposition of the second layer.

8. A method as claimed in claim 1, wherein each of said successive layers has a surface profile defined by a generally spiral ridge extending along said body.

9. In a method of forming a preform from which an optical fibre can be drawn, in which method successive layers of matter are deposited by vapour deposition on a rotating cylindrical body which is traversed by a heat source, wherein the improvement comprises:

for the deposition of at least three successive layers, the rate of rotation of said body during deposition of each of at least three successive layers differs from the rate of rotation of said body during deposition of a preceding or succeeding layer of said at least three successive layers so as to generate in one of said layers a surface profile different to a surface profile generated in another said layer.

10. A method as claimed in claim 9, wherein said rates of rotation comprise a faster rate and a slower rate and wherein the faster rate is substantially equal to one half the slower rate plus a product of the slower rate and an integer.

* * * * *

UNITED STATES PATENT AND TRADEMARK OFFICE
CERTIFICATE OF CORRECTION

PATENT NO.   : 5,518,516
DATED        : May 21, 1996
INVENTOR(S)  : Garnham

It is certified that error appears in the above-indentified patent and that said Letters Patent is hereby corrected as shown below:

```
Col. 6, line 40, change "a predetermined" to
        --an--; and change "so as" to --sufficient--.
```

Signed and Sealed this

Thirty-first Day of December, 1996

Attest:

BRUCE LEHMAN

*Attesting Officer*           *Commissioner of Patents and Trademarks*